J. A. TYNAN.

HEATING STOVE.

APPLICATION FILED OCT. 30, 1908.

Reissued Apr. 6, 1909.

12,937.

2 SHEETS—SHEET 1.

WITNESSES:

J. H. Gardner.

H. R. Woddell.

INVENTOR:

John A. Tynan,

BY

E. T. Silvius,

ATTORNEY.

THE NORRIS PETERS CO., WASHINGTON, D. C.

J. A. TYNAN.

HEATING STOVE.

APPLICATION FILED OCT. 30, 1908.

Reissued Apr. 6, 1909.

12,937.

2 SHEETS—SHEET 2.

WITNESSES:

J. H. Gardner

H. R. Woddell.

INVENTOR:

John A. Tynan,

BY

E. T. Silvius,

ATTORNEY.

THE NORRIS PETERS CO., WASHINGTON, D.C.

UNITED STATES PATENT OFFICE.

JOHN A. TYNAN, OF INDIANAPOLIS, INDIANA, ASSIGNOR OF ONE-HALF TO BYRAM FOUNDRY COMPANY, OF INDIANAPOLIS, INDIANA, A CORPORATION OF INDIANA.

HEATING-STOVE.

No. 12,937. Specification of Reissued Letters Patent. Reissued April 6, 1909.

Original No. 851,044, dated April 23, 1907, Serial No. 248,577. Application for reissue filed October 30, 1908. Serial No. 460,374.

*To all whom it may concern:*

Be it known that I, JOHN A. TYNAN, a citizen of the United States, residing at Indianapolis, in the county of Marion and State of Indiana, have invented certain new and useful Improvements in Heating-Stoves, of which the following is a specification, reference being had therein to the accompanying drawings.

This invention relates to heating-stoves or furnaces and particularly to a novel arrangement of air circulating and heating means whereby the air in the chamber in which the heating-stove is situated is caused to circulate through said circulating and heating means to rapidly raise its temperature.

The objects of this invention are, first, to provide a cheap, efficient, and economical or fuel-saving heating-stove or furnace; also, to provide an air-heating means including improved air-heating tubes and arrangement thereof whereby the air will be thoroughly and quickly heated and speedily circulated through said air-heating means, and whereby the heated air will be rapidly discharged from and out of said air-heating means of the stove or furnace to be disseminated throughout the chamber or room wherein said stove is situated. I attain these objects by means of the heating-stove or furnace illustrated in the accompanying drawings, in which similar characters of reference designate like parts throughout the several views.

Figure 1:
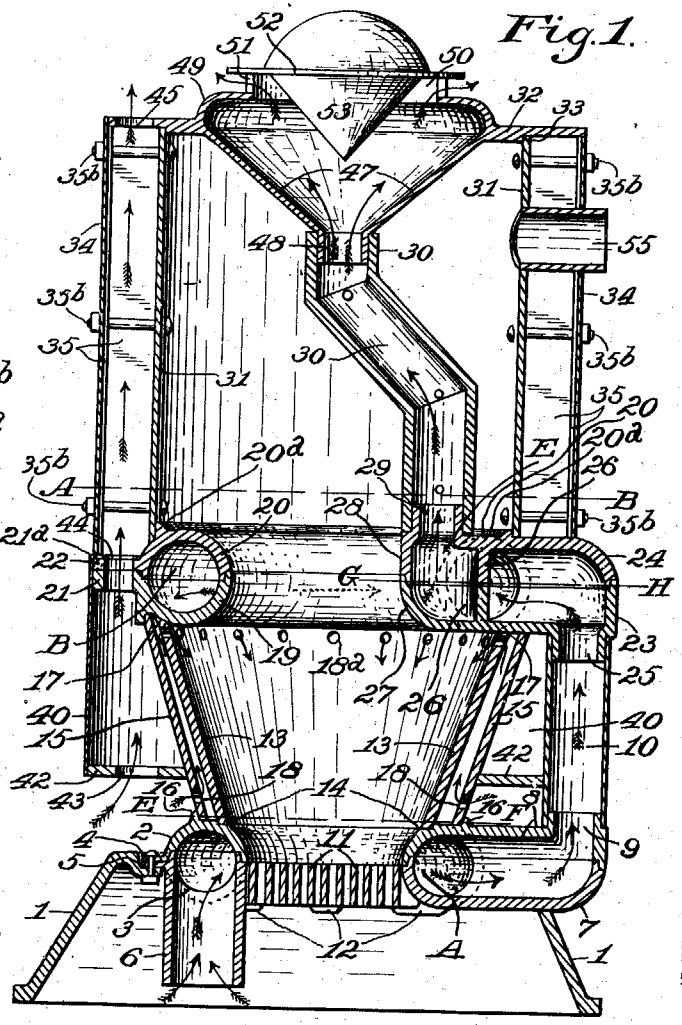
Figure 2:
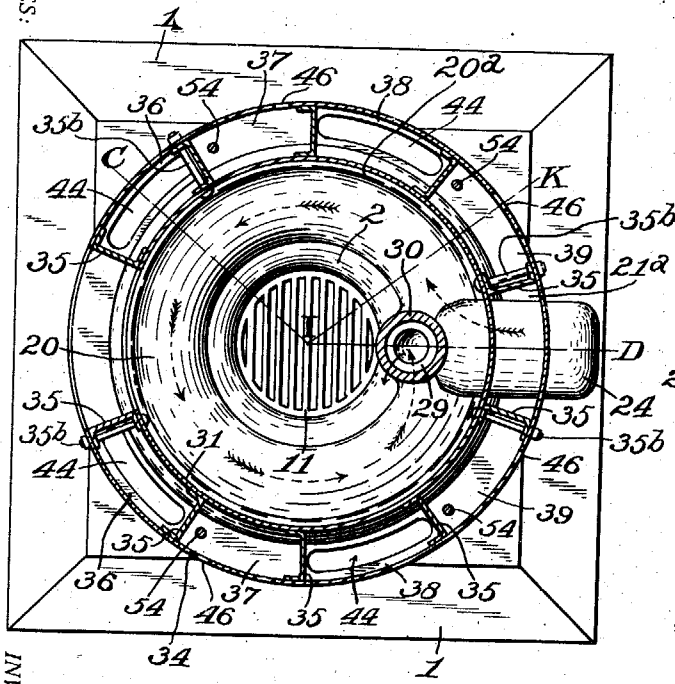
Figure 3:
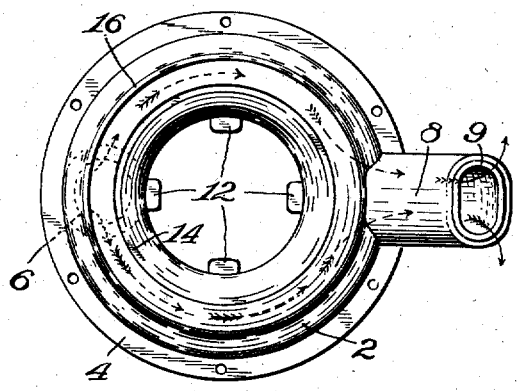
Figure 5:
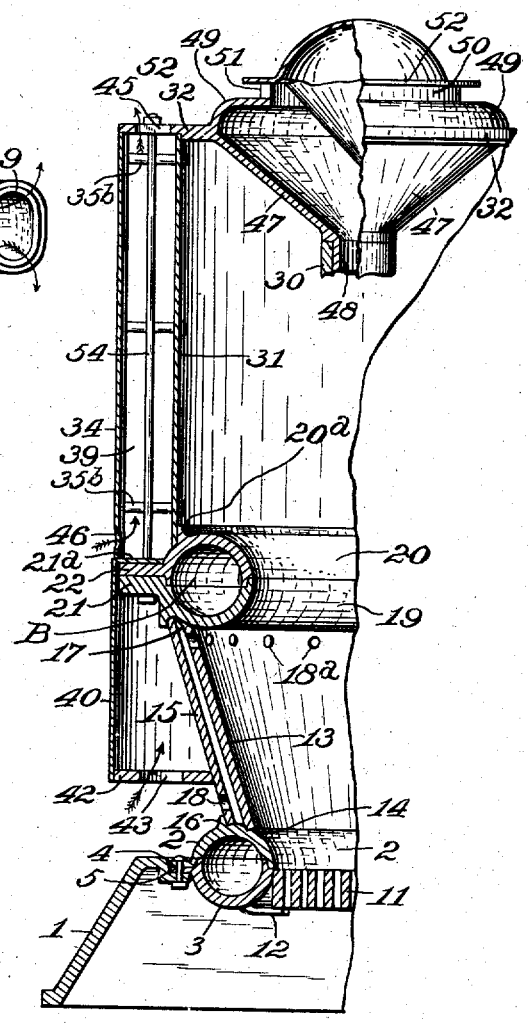
Figure 4:
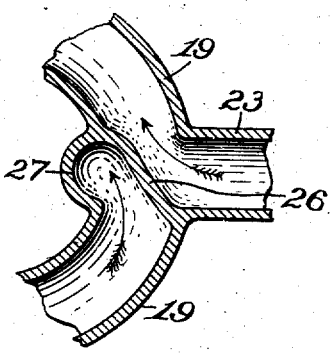

Figure 1 is a sectional elevational view of my construction of a heating-stove, showing the air-heating arrangement thereof, and taken approximately through the line C D. (See Fig. 2.) Fig. 2 is a sectional plan view of the same, taken approximately through the line A B. (See Fig. 1.) Fig. 3 is a similar plan view taken approximately through the line E F. (See Fig. 1.) Fig. 4 is a detail broken sectional plan view of the upper air circulating and heating tube, taken through the line G H, (see Fig. 1;) and Fig. 5 is a broken vertical section of a portion of the stove, taken approximately through the chamber 37 at the line I K. (See Fig. 2.)

The base 1 of the stove may be of any suitable form of construction and is provided for the purpose of supporting the stove at a distance above the ground.

A lower or base annular air-circulating and heating tube A is preferably composed of an upper half 2 and a lower half 3, and which halves are provided respectively with outer flanges 4 and 5, which extend around the outer peripheral edges of said tube-halves 2 and 3 and are suitably bolted or connected together to form a single tube. The top portion of the base 1 is provided with an annular recess, which is adapted to receive the flange 5 of the lower half 3 of the tube A to support the same. Integral on the lower half 3 of the tube A and situated thereon to be at the front of the stove is a depending air-inlet tube 6, by which the colder air is supplied to the tube A, and on the opposite side of said tube is a horizontal outlet-tube, which comprises a lower portion 7 and an upper portion 8, which lower and upper portions are formed integral with the lower and upper halves 3 and 2 of the air circulating and heating tube A. On the ends of the said outlet-tube portions 7 and 8 are formed the elbow-halves 9, whereto the lower connecting or uptake tube 10 is fitted.

Situated in the center opening of the lower or base annular tube A is the grate 11, which rests on supports 12, which latter are formed integral on the lower half 3 of the tube A.

The fire-pot 13 is tapered or reduced at its bottom end or is in the form of a truncated cone and has its reduced bottom end let into a recessed or flattened bearing portion 14, formed in the upper half 2 of the tube A.

An exterior fire-pot casing 15 is also made in the form of a truncated cone and is arranged to completely encircle and inclose the fire-pot 13 and has its bottom smaller end adapted to rest on the upper half 2 of the tube A and to fit in an annular ring 16, formed integral on the said half 2, whereby the base of said casing is maintained in concentric position relative to the fire-pot 13 and said tube A. The top portion 17 of the fire-pot is slightly flared out and is provided with a series of hot-air-inlet openings 18[a], through which hot air is admitted into the interior of the fire-pot 13 directly over the fuel therein to promote a more thorough combustion, and thereby prevent the formation of smoke.

In the bottom reduced portion of the exterior fire-pot casing 15 are a series of air-inlet openings 18, through which the external air passes to and into the space or chamber between the fire-pot 13 and the exterior inclosing casing 15, to be heated, thence to and through the top openings 18[a] of the fire-pot, as previously described, above the fire to support the combustion of the fuel.

An upper air circulating and heating tube B is situated above the enlarged or flared portions of the fire-pot 13, and the said tube comprises a lower half 19 and an upper half 20, which halves are fitted together to form the complete tube, and said halves are provided respectively with exterior peripheral flanges 21 and 22, which serve for clamping together the half 19 and the half 20, comprising said circulating and heating tube B.

The upper air heating and circulating tube B is preferably of larger diameter than the lower or base air heating and circulating tube A in order to provide ample capacity and heating surface for the reception of the partially heated and rarefied air as it is delivered from the base circulating and heating tube A. Integral on the said halves 19 and 20 of said tube B is an inlet-elbow which comprises a lower half portion 23 and an upper half portion 24, which elbow is situated at the rear of the stove to be connected to the top end of the lower connecting or uptake pipe 10.

On the lower half portion 23 of the elbow is formed a depending tube portion 25, which is adapted to fit in the top end of the lower connecting-pipe or uptake-tube 10.

A vertical dividing wall or diaphragm 26 is formed in the halves 19 and 20 of the upper air heating and circulating tube B and comprises upper and lower portions or halves, which portions or halves are situated one on the other and directly opposite the mouth of the inlet-elbow of said heating and circulating tube B, and said dividing wall or diaphragm is provided for the purpose of forming a separating and deflecting wall, whereby the current of heated air entering the inlet end of the circulating-tube B will be compelled to flow in one direction, as in the direction indicated by the arrows, (see Fig. 2,) and thence to and through the uptake-elbow E. (See Fig. 1.)

The up-take elbow E comprises a lower elbow portion 27 and an upper portion 28, formed integral on the air heating and circulating tube portions or halves 19 and 20, and situated near the dividing wall or diaphragm 26. On the top end of the uptake portion 28 is formed a nipple 29, upon which is fitted the uptake-tube 30, whereby the latter is supported. A casing or combustion-chamber 31 rests on the top portion 20 of the upper air heating and circulating tube B against an annular flange 20[a] that is formed on the outer side of the half 20, and on the top end of said casing or combustion-chamber 31 is the stove-top 32, which is reduced on its under side near the edge thereof to form a flange 33, which fits within the casing or combustion-chamber 31 to center or maintain said stove-top centrally on the casing or combustion-chamber 31. An outer casing 34 surrounds said inner casing 31, and said casing 34 is fitted to and rests on the top side of the flange 21[a] hereinafter described at its bottom end and at its top end is fitted to the bottom side of the stove-top 32.

Vertically extending distance channel-irons 35 extend from the flange 21[a] to the under side of the stove-top 32 and divide the annular space between the inner casing or combustion-chamber 31 and the outer casing 34, surrounding same, into a series of air-circulating chambers 36, 37, 38 and 39, and said channel-irons 35 are preferably secured to said inner and outer casings 31 and 34 by suitable bolts 35[b], which preferably pass through the flanges of said channel-irons and said casings to securely bind both said casings to said channel-irons and maintain them concentrically, the inner with the outer casing.

The chambers 36 and 38 are similar and are supplied with heated air by the openings 44, hereinafter described, while the chambers 37 and 39, which are alike, receive air through the openings 46, hereinafter described.

An outer lower casing 40 surrounds the casing 15 and is provided with a flange 21[a], which rests on the top side of the flange 22, so that the casing 40 is suspended from said flange. The bottom portion of the casing 40 is provided with an annular base-closure 42, in which latter a series of openings 43 are formed, which openings correspond with and fall directly under the air-openings 44, formed in the flanges 21, 21[a] and 22. Similarly-situated openings 45 are formed in the stove-top 32, so that air admitted through the openings 43 into the air-chamber between the casing 15 and the outer casing 40 will pass through the openings 44 into the air-space between the casings 31 and 34, thence through the openings 45, formed in the stove-top 32.

It will be noted that air-circulating-chambers 37 and 39 are not connected with the air-space situated between the casings 15 and 40; but openings 46 are formed in the outer casing 34, around the base thereof adjacent the flange 22, so that the exterior air can enter and pass through said base-openings into said chambers 37 and 39, thence out of suitable openings, as 45, formed in the stove-top 32. A conical air-heating chamber 47 depends from the bottom inner side of the stove-top 32, and on its reduced smaller end is a nipple 48, which fits in the top end of the uptake-tube 30 to receive the air discharged therefrom.

Integral on the stove-top 32 is preferably formed the raised chamber portion or cap 49, which closes the top end of the conical heating-chamber 47. A flange or ring portion 50 is formed on the top side of the chamber portion or cap 49, and in the same are formed a series of air-outlet openings 51. A lid 52 rests on the said ring, and the same is provided with a deflecting-cone 53, whereby the air as it is discharged by the uptake-tube 30 into the conical chamber 47 is deflected to and through the openings 51. Tie-bolts 54 extend from the bottom side of the flange 21 to the top side of the stove-top 32 to securely bind the intervening parts together.

The smoke-stack-connecting tube 55, or the tube to which the smoke-stack is connected, is situated at or near the top of the casing 31. (See Fig. 1.)

Although the preferred construction is specifically described in all essential details, various modifications are contemplated within the scope of the claims.

It will be seen that in the construction above-described the lower air-heating tube A practically forms the lower part of the fire-pot and is exposed to the direct heat of the bed of fire on the grate, since the grate is supported at the lower portion of the tube. Also the upper tube B is supported at its outer side or peripheral portion, so that nearly the whole tube is exposed to the heat.

In operation, the air entering the inlet 6 becomes somewhat heated in its passage through the tube A, the air then passing up into the larger tube B in which it is heated to a high degree and expanded in its passage through the tube, the hot air then passing through the tube 30 in which it is further heated, or with a low fire kept hot, and then passes out through the openings 51, thus inducing circulation of the air and also economically heating the air. The air in the room is also heated and induced to circulate when the casings 34 and 40 are employed by reason of the air passing through the compartments or chambers formed thereby with the inner parts of the structure. Also, the tube B serves a useful purpose in deflecting the heated air that enters through the apertures 18[a] toward the center of the fire-pot, so that the most perfect combustion is assured.

Having thus described my invention, what I claim as new, is—

1. An annular tube comprising two parts joined together, one of the parts having a peripheral flange for its support and having also an inlet tube and also grate supports thereon, the said part having also one part of an outlet tube on the periphery thereof, and the other one of the two parts of the annular tube having the completing part of the outlet tube on the periphery thereof and having also an annular seat thereon to support a fire-pot.

2. An annular tube comprising two parts joined together, one of the parts being adapted to rest upon a fire-pot and having one part of an inlet tube on the periphery thereof, said part of the annular tube having one part of a vertical partition formed in the inner side thereof and part of an outlet tube opposite to the inlet tube part, and the other one of the parts of the annular tube having the completing part of the inlet tube on the periphery thereof and having also the completing part of the vertical partition formed on the inner side thereof, the outer side of said last-described part of the annular tube being adapted to support a combustion chamber wall and having the completing part of the outlet tube thereon, said partition being situated in the annular tube between the inlet tube and the outlet tube.

3. A heating stove or furnace including a base, an annular bottom or base air-heating tube having an annular fire-pot seat on the top thereof and a grate support projecting from the under side thereof, the tube having a peripheral flange resting on the base and having also an inlet tube on the under side and an outlet tube on the periphery thereof, a grate on the grate support encircled by the tube, and a fire-pot on the fire-pot seat.

4. A heating stove or furnace including a base, an annular base air-heating tube having an annular fire-pot seat and also a flange on the top thereof, the flange extending about the seat at a distance therefrom, the tube having a flange on the periphery thereof resting on the base and having also an inlet tube on the under side and an outlet tube on the periphery thereof, a grate supported at the under side of the annular tube and encircled thereby, a fire-pot on the fire-pot seat and having apertures in the upper portion thereof, a fire-pot casing seated on the annular tube in engagement with the flange on the top thereof and having apertures in the lower portion thereof, the casing extending about the fire-pot and spaced therefrom, and means engaging the tops of the fire-pot and the casing and covering the space between them.

5. A heating stove or furnace including a base, a grate and a fire-pot mounted on the base, an annular air-circulating tube seated upon the top of the fire-pot and having a vertical partition therein extending across the passageway in the tube, an inlet tube on the periphery of the annular tube near one side of the partition, an outlet tube on the annular tube at the opposite side of the partition, a combustion-chamber wall on the annular tube and extending across the top of inlet tube, a top on the wall, and an uptake tube connected to the outlet tube to conduct air from the annular air-circulating tube.

6. In a heating stove or furnace, the combination of a base, an annular bottom air-heating tube seated on the base and having an inlet opening and also an outlet opening, a grate supported at the lower portion of the annular tube and encircled thereby, a fire-pot seated on the top of the annular tube and having apertures in the upper portion thereof, an upper annular air-circulating tube seated on the top of the fire-pot and extending inward above the plane of the apertures in the fire-pot and having an inlet opening and an outlet opening, a combustion-chamber wall seated on the annular air-circulating tube, a top on the wall, a conduit connecting the outlet opening of the bottom air-heating tube with the inlet opening of the upper air-circulating tube, and a conduit connected with the outlet opening of the upper air-circulating tube to conduct air therefrom.

7. In a heating stove or furnace, the combination of a grate, a support for the grate, an annular bottom or base air-heating tube extending about the grate and also to a plane above the top of the grate to form the lower portion of a fire-pot wall, the top of the tube having an annular fire-pot seat thereon, an inlet-tube on the under side of the annular tube, an outlet-tube on the periphery of the annular tube, and a fire-pot body on the annular fire-pot seat and with the inner portion of the wall of the annular tube forming the complete upright wall of the fire-pot.

8. In a heating stove or furnace, the combination with a fire-pot, and a supporting-base, of a lower annular air-circulating tube situated between the lower portion of said fire-pot and said supporting-base and provided with a cold-air inlet and a hot-air outlet, said hot-air outlet situated remotely to said cold-air inlet, said tube composed of upper and lower halves, an upper annular air-circulating tube situated upon said fire-pot and extending over the top edge thereof, said upper tube provided with air inlet and outlet openings, a vertically-extending deflecting or dividing wall situated at the inlet of said upper annular tube whereby the incoming air is directed around the tube to the outlet thereof, an uptake connecting the inlet opening of said upper annular air-circulating tube with the outlet of said lower annular air-circulating tube, a combustion-chamber situated above said upper air-circulating tube, an upper inclosing combustion-chamber cover, and an uptake connected with the outlet opening of said upper annular air-circulating tube, and extending upwardly within the said combustion-chamber and having its outlet end arranged to discharge the heated air above said combustion-chamber cover.

9. In a heating stove or furnace, the combination of a base, a grate and a fire-pot mounted on the base, an annular air-circulating tube seated upon the top of the fire-pot and having a vertical partition therein extending across the passage-way in the tube, an inlet tube on the annular tube at one side of said partition, an outlet tube on said annular tube at the opposite side of said partition, a flange on the periphery of said annular tube and having apertures therein, a casing supported by said flange and extending about the fire-pot, a bottom closure attached to said casing and having apertures therein, a combustion-chamber wall on said annular tube, an apertured upper combustion-chamber cover, an outer casing seated on said flange and connected to said cover and having apertures in the lower portion thereof, and vertical partitions connected to said combustion-chamber wall and to said outer casing and extending from said flange between apertures therein to said cover between apertures therein.

10. In a heating stove or furnace, the combination of a grate, a support for the grate, an annular bottom or base air-heating tube extending about the grate and also to a plane above the top of the grate and forming the lower portion of a fire-pot wall, the top of the tube having an annular fire-pot seat and also an annular flange thereon, the flange extending about the seat at a distance therefrom, an inlet tube and an outlet tube on the annular tube, a fire-pot body on the annular fire-pot seat and having apertures in the upper portion of the wall thereof, an upper annular air-heating tube connected at its under outer side to the top of said fire-pot body and having a vertical partition therein extending across the passage-way in the tube, an inlet tube on said upper annular tube at one side of said partition and connected with the outlet tube of said bottom or base annular tube, an outlet-tube on said upper annular tube at the opposite side of said partition, a casing on said bottom or base annular tube against said flange thereon and connected to said upper annular tube and the inlet-tube wall that is thereon, the lower portion of said casing having apertures therein, and a covered combustion-chamber wall on said upper annular tube.

11. In a heating stove or furnace, the combination of a grate, a support for the grate, an annular bottom or base air-heating tube extending about the grate and also to a plane above the top of the grate and forming the lower portion of a fire-pot wall, the top of the tube having an annular fire-pot seat thereon, an inlet-tube on the under side of the annular tube, an outlet tube on the periphery of the annular tube, a fire-pot body on the annular fire-pot seat and with the inner portion of the wall of the annular tube forming the complete upright wall of the fire-pot, an annular upper air-heating tube having a vertical partition therein extending across the passage-way in the tube, an inlet-tube on the periphery of said upper annular tube at one side of said partition and connected with said outlet-tube that is on said bottom or base annular tube, an outlet-tube on said upper annular tube at the opposite side of said partition, a combustion-chamber wall on said upper annular tube, an apertured top on said combustion-chamber wall, and an up-take tube connected to said outlet-tube that is on said upper annular tube and connected also with said apertured top.

12. In a heating-stove, the combination with a fire-pot having the form of an inverted truncated cone and provided with a series of air-inlet openings situated at or near its upper edge, a fire-pot-inclosing casing surrounding said fire-pot to form a hot-air chamber between them, said casing provided with air-inlet openings at or near its bottom edge, and a supporting-base, of a lower annular air-circulating tube situated between the lower reduced portion of said fire-pot and said base and provided with a forward cold-air inlet and a hot-air outlet, said hot-air outlet situated diametrically opposite said cold-air inlet, said tube composed of upper and lower sections or halves, an upper annular air-circulating tube situated upon said fire-pot to extend along the top edge thereof, said tube provided with air inlet and outlet openings, a vertically-extending deflecting or dividing wall situated at the inlet of said upper annular tube whereby the incoming air is directed to flow in one direction around the tube to the outlet thereof, an uptake situated exteriorly of said stove connecting said lower annular air-circulating tube to said upper annular air-circulating tube, a combustion-chamber situated above said upper air-circulating tube, an upper inclosing combustion-chamber cover, and an uptake connected to the outlet of said upper annular air-circulating tube and extending upwardly within the combustion-chamber of the stove and having its outlet end arranged to discharge the heated air above said combustion-chamber cover.

13. In a heating-stove, the combination with a fire-pot having the form of an inverted truncated cone and provided with a series of air-inlet openings situated at or near its upper edge, a fire-pot-inclosing casing surrounding said fire-pot to form a hot-air chamber between them, said casing provided with air-inlet openings situated at or near its bottom edge, an outer casing situated to surround the upper portion of said fire-pot-inclosing casing to form an outer air-chamber, said outer chamber provided with air-inlet openings at or near its bottom, and a supporting-base, of a lower annular air-circulating tube situated between the lower reduced portion of said fire-pot and said base and provided with a forward cold-air inlet and a hot-air outlet, said hot-air outlet situated diametrically opposite said cold-air inlet and said tube composed of upper and lower sections or halves, an upper annular air-circulating tube situated upon said fire-pot to extend along the top edge thereof, said tube provided with air inlet and outlet openings, a vertically-extending deflecting or dividing wall situated at the inlet of said upper annular tube whereby the incoming air is directed to flow in one direction around the tube to the outlet thereof and said tube also composed of upper and lower sections or halves, an uptake situated exteriorly of said stove connecting said lower annular air-circulating tube to said upper annular air-circulating tube, a combustion-chamber situated above said upper annular air-circulating tube, an upper combustion-chamber cover provided with an air-chamber of an inverted-cone form, said chamber provided with a lower reduced air-inlet end and upper air-outlet openings, an uptake connected to the outlet of said upper annular air-circulating tube and extending upward within said combustion-chamber and connected to the reduced inlet end of said cover-chamber, and a casing surrounding said combustion-chamber to form an air-chamber, the air spaces or chambers formed by said combustion-chamber and said fire-pot casings being connected by air ducts or passages, and each of said chambers provided with lower air-inlet and upper air-outlet openings.

In testimony whereof I affix my signature in presence of two witnesses.

JOHN A. TYNAN.

Witnesses:
E. T. SILVIUS,
J. H. GARDNER.